US006265664B1

(12) United States Patent
Sakaguchi et al.

(10) Patent No.: US 6,265,664 B1
(45) Date of Patent: Jul. 24, 2001

(54) SHIELDED CABLE JOINING STRUCTURE AND JOINING METHOD

(75) Inventors: Tadahisa Sakaguchi; Yasumichi Kuwayama, both of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/377,490

(22) Filed: Aug. 20, 1999

(30) Foreign Application Priority Data

Aug. 25, 1998 (JP) ........................................ 10-239168

(51) Int. Cl.[7] ........................................ H02G 15/02

(52) U.S. Cl. ........................................ 174/78

(58) Field of Search ........................................ 174/75 C, 78, 174/84 C, 74 R; 439/424, 882, 98, 99

(56) References Cited

U.S. PATENT DOCUMENTS 3,499,101 * 3/1970 Forney, Jr. et al. ............... 174/75 C
3,546,365 * 12/1970 Collier ............................ 174/78
5,061,827 * 10/1991 Grabbe ............................ 174/75 C
5,658,163 * 8/1997 DeRoss ............................ 439/424
5,824,962 * 10/1998 Katsuma ........................ 174/84 C X

FOREIGN PATENT DOCUMENTS 2232013 11/1990 (GB) .
2321798 8/1998 (GB) .
7-201383 8/1995 (JP) .

OTHER PUBLICATIONS

UK Search Report dated, Oct. 29, 1999.

* cited by examiner

*Primary Examiner*—Chau N. Nguyen
(74) *Attorney, Agent, or Firm*—Finnegan, Henderson, Farabow, Garrett & Dunner, L.L.P.

(57) ABSTRACT

In a shield terminal joining structure for joining a shield terminal to a prescribed grounding position along a shielded cable that is formed by an inner core wire made of a conductor, an inner insulation covering that covers the inner core wire, a braid that is provided around the outside periphery of the inner insulation covering, an outer insulation covering that covers the braid, resistive welding is performed while crimping parts of the shield terminal to the outer covering of the shielded cable at the grounding position, so as to melt away part of the outer insulation covering, enabling a weld to be made between the crimping parts and the braid of the shielded cable.

6 Claims, 6 Drawing Sheets

SHIELDED CABLE JOINING STRUCTURE AND JOINING METHOD

BACKGROUND OF THE INVENTION

1. Field of the Invention

The present invention relates to a shielded cable joining structure and to a method for joining a shielded cable.

2. Description of the Related Art

A termination structure for the above-noted type of shielded cable is disclosed in the Japanese Patent Application Laid-Open Publication No. 7-201383, in which a shielded cable is formed by an inner core wire that is made of a conductor, an inner insulation covering that covers the inner core wire, a braid that is provided around the periphery of the inner insulation covering, and an outer insulation covering that covers the braid.

In the above-noted related art, part of the outer insulation covering at the end part of the shielded cable is removed, the inner insulation covering and braid are separated from one another, and the ends of the inner core wire that is exposed at the end part of the inner insulation covering and the braid are each connected by means of a terminal fixture. Before crimping the terminal fixture onto the end of the braid, the end part of the braid is bundled together by heat-shrink tubing that contracts by the application of heat.

In the above-noted termination structure for a shielded cable, however, because the terminal fixture is crimped onto the end of the braid after the braid is separated from the inner insulation covering, not only is there a danger of damaging the braid when performing the crimping operation, but also there is a part thereof that is not shielded. Additionally, because it is essential to have a bundling member such as heat-shrink tubing in order to bundle together the end part of the braid, the task of termination was cumbersome.

SUMMARY OF THE INVENTION

Accordingly, it is an object of the present invention to improve on the above-noted drawbacks in the related art, by providing a shielded cable joining structure and joining method, whereby it is easy to achieve a reliable joining of a shield terminal to the exposed part of the braid, without damaging the braid.

In order to achieve the above-noted object, the present invention adopts the following basic technical constitution.

Specifically, from the first aspect of the present invention, there is provided a joining structure for a shielded cable, comprising an inner core wire made of a conductor, an inner insulation covering that covers the inner core wire, a braid that is provided around the outside periphery of the inner insulation covering, an outer insulation covering that covers the braid, and a shield terminal that has a crimping part that is crimped over the outer insulation covering, wherein the crimping part of the shield terminal and the braid are welded by melting away part of the outer insulation covering by resistive welding, in a condition in which the crimping part of the shield terminal is crimped.

In this shielded cable joining structure, by using resistive welding to melt away part of the outer insulation covering using resistive welding with the crimping part of the shield terminal crimped, so as to enable the achievement of a welding of the shield terminal crimping part and the braid, it is possible not only to minimize damage to the braid and broken connections, but also to improve the reliability of the connection. Additionally, because there is no need to separate the braid from the inner insulation or remove part of the outer insulation covering, the shielding performance is improved.

Preferably, the crimping part of the shield terminal may be substantially U-shaped, with mutually opposing end parts capable of making mutual contact at an inclination.

In this configuration, because the end parts of the substantially U-shaped crimping part that holds the braid of the shielded cable make contact with each other with no space therebetween, damage to and broken connections in slender braid wires are reliably prevented.

Preferably, the crimping part of the shield terminal may be substantially U-shaped, with mutually opposing end parts capable of making mutual contact along a direction that is parallel to the longitudinal direction of the braid.

In this joining structure, the U-shaped opposing crimping part enables easy and reliable connection to any grounding position, whether at a cable end or at an intermediate position therealong.

From the second aspect of the present invention, there is provided a method for joining a shield terminal to a prescribed position on a shielded cable which is formed by an inner core wire made of a conductor, an inner insulation covering that covers the inner core wire, a braid that is provided around the outside periphery of the inner insulation covering, and an outer insulation covering that covers the braid, the method having steps of setting a crimping part of the shield terminal over the outer insulation covering at a grounding position of the shielded cable, causing a pre-heating to flow between a pair of electrode tips while pressure is applied between the electrode tips so as to crimp the crimping part, thereby softening the outer insulation covering and removing it by means of the applied force, and causing a welding current to flow between the pair of electrode tips, so as to achieve a weld between the crimping part of the shield terminal and the braid.

In the above-described method of joining a shielded cable, by setting the crimping part of the shield terminal over outer insulation covering at a grounding point of the shielded cable, and then using a pre-heating current to melt away part of the outer insulation covering while crimping the crimping part, so as to achieve a weld between the crimping part and the part of the braid that is exposed by partial removal of the outer insulation covering, the need to separately remove part of the outer insulation covering is eliminated, thereby enabling a simplification of the process and improvement in workability.

DESCRIPTION OF THE PREFERRED EMBODIMENTS

Figure 1A:
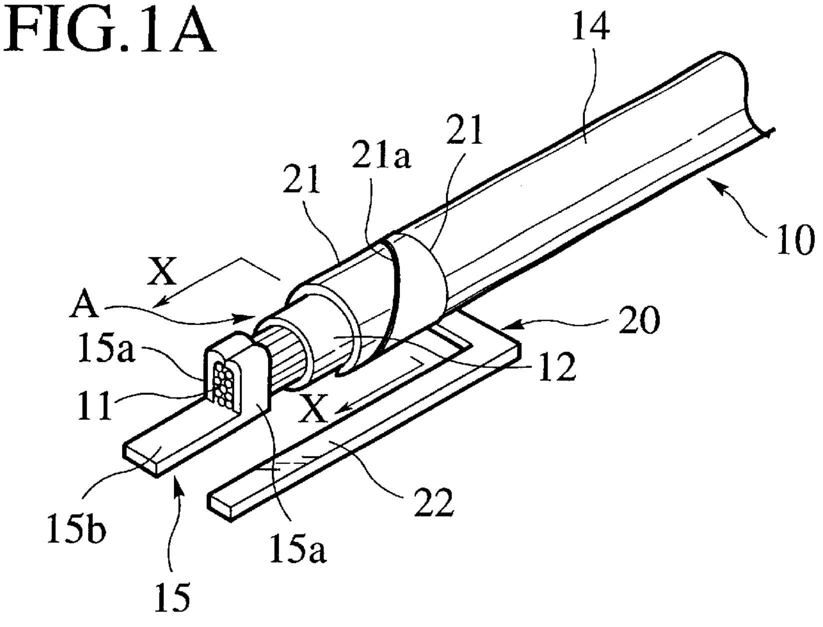
FIG. 1A is a perspective view that shows an embodiment of a joining structure for a shielded cable according to the present invention.
Figure 1B:
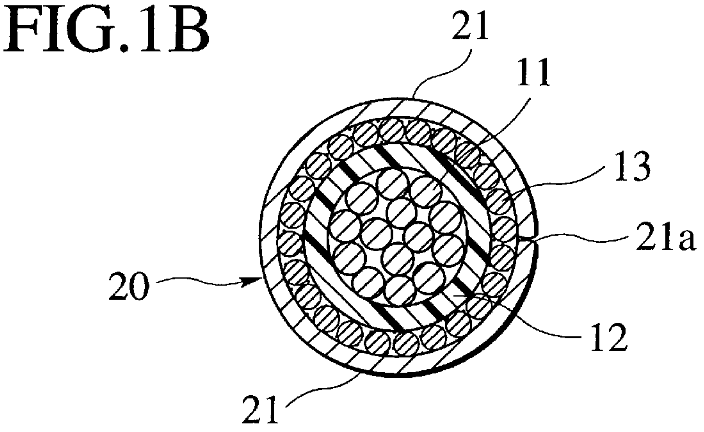
FIG. 1B is a cross-section view along the cutting line X—X indicated in FIG. 1A.

Embodiments of the present invention will be described in detail below, with reference to relevant accompanying drawings.

As can be seen in FIGS. 1A and 1B and FIGS. 2A, 2B, and 2C, the shielded cable 10 to which the joining structure of the present invention is applied is formed by an inner core wire 11, which is made of a conductor, an inner insulation covering 12 that covers the inner core wire 11, a braid 13, which is provided around the periphery of the inner insulation covering 12 and which is woven in a cloth-like manner from a plurality of slender bare wires, and an outer insulation covering 14, which covers the braid 13. Part of the outer insulation covering 14 at end A (the grounding position) of the shielded cable 10 is removed, so that part of the inner core wire 11 is exposed. A pair of crimping parts 15*a* of a terminal fixture 15 are crimped around the exposed end A of the inner core wire 11. The male tab (connection part) 15*b* of the terminal fixture 15 makes contact with, for example, a mating female terminal (not shown in the drawing) which protrudes within a hood 16*a* of a connector 16.

Figure 1C:
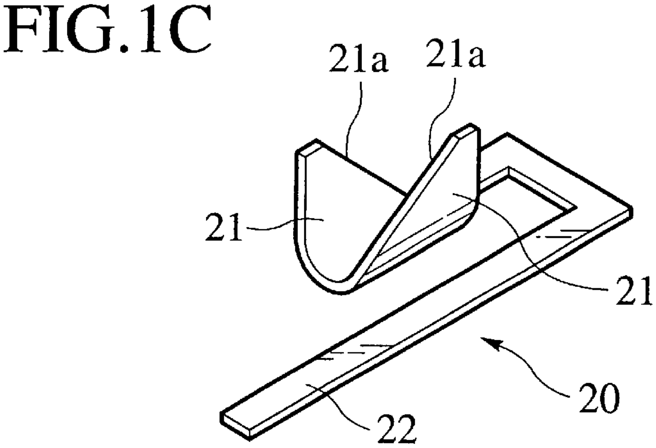
FIG. 1C is a perspective view of a shield terminal that is used in this joining structure.

Additionally, a shield terminal 20 can be freely joined to an exposed part of the braid 13, between the outer insulation covering 14 and the inner insulation 12 at end A of the shielded cable. As shown in FIG. 1C and FIG. 2B, the shield terminal has a pair of crimping parts 21, 21 that are approximately U-shaped when viewed from the front and which are crimped onto and make a metallic joint with the braid 13, and male tab (connection part) 22 which is L-shaped when viewed from the top. The crimping parts 21 are approximately triangular in shape and are bent so as to be in mutual opposition, and the inclined edge 21*a* of each of which comes into contact with the inclined edge 21*a* of the opposite crimping part 21 when the crimping part is crimped.

Figure 2A:
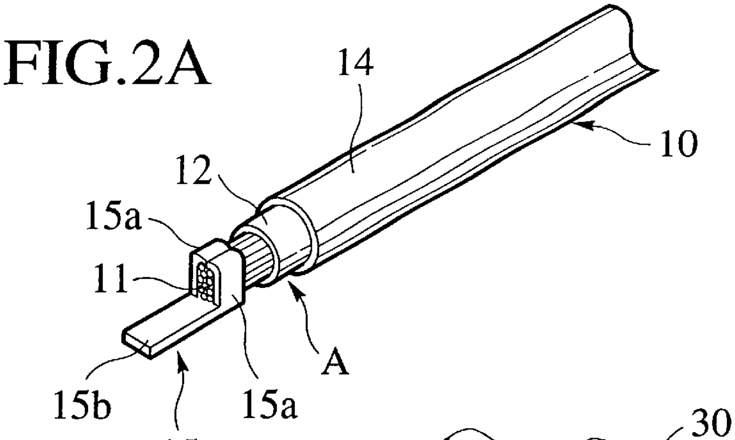
FIG. 2A is a perspective view of the shielded cable to which the joining structure of FIG. 1 is applied.
Figure 2B:
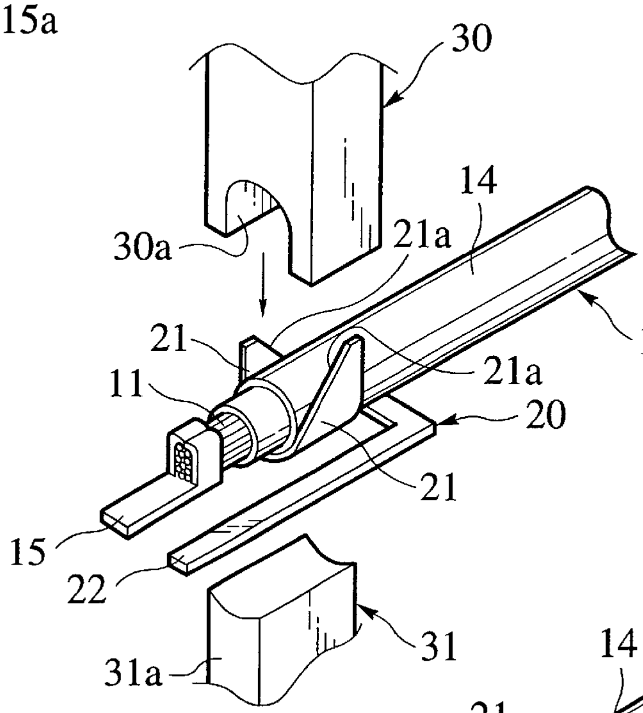
FIG. 2B is a perspective view that shows the condition before the shielded terminal is joined to the shield cable.
Figure 3A:
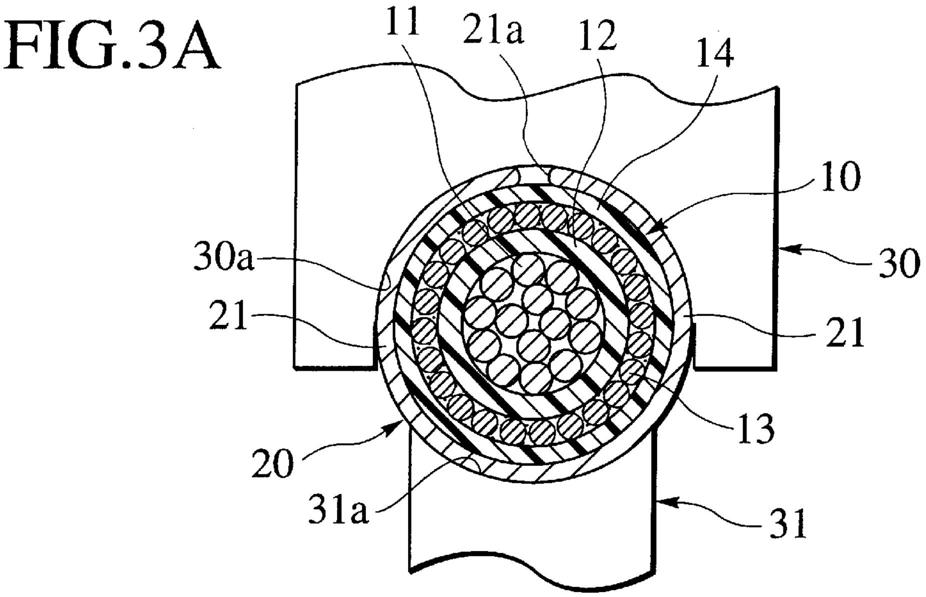
FIG. 3A is a cross-section view that shows the condition of the above-noted shielded cable and shield terminal before joining.

Turning to the method for joining the shield terminal 20 to the shielded cable 10, first, as shown in FIG. 2A, after crimping the terminal fixture 15 onto the core wire 11 that is exposed at end A (the grounding position) of the shielded cable, the pair of crimping parts 21 of the shield terminal 20 are fitted over the outer insulation covering at end A of the shielded cable 10, as shown in FIG. 2B. Then, as shown in FIG. 3A, the crimping parts 21 are held between a curved surface 30*a* of an upper electrode tip 30, which serves also as a crimper, and a curved surface 31*a* of a lower electrode tip 31, which serves also as an anvil, pressure being thereby applied to the crimping parts 21. When this is done, by the crimping action achieved by the force of the upper and lower electrode tips 30 and 31, a path for the flow of a resistive welding current is established by the contact made between the upper electrode tip 30, the crimping parts 21, and the lower electrode tip 31.

Figure 2C:
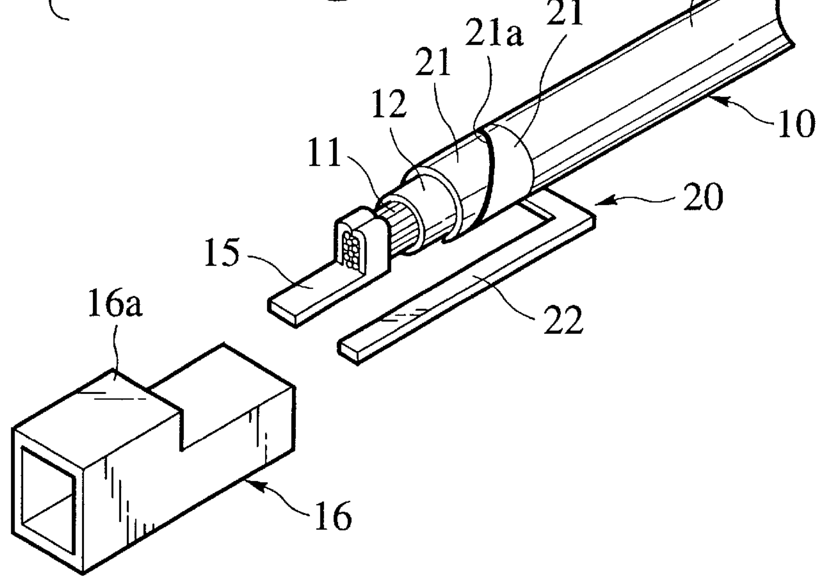
FIG. 2C is a perspective view that shows the condition after joining the shielded cable to the shield terminal.
Figure 3B:
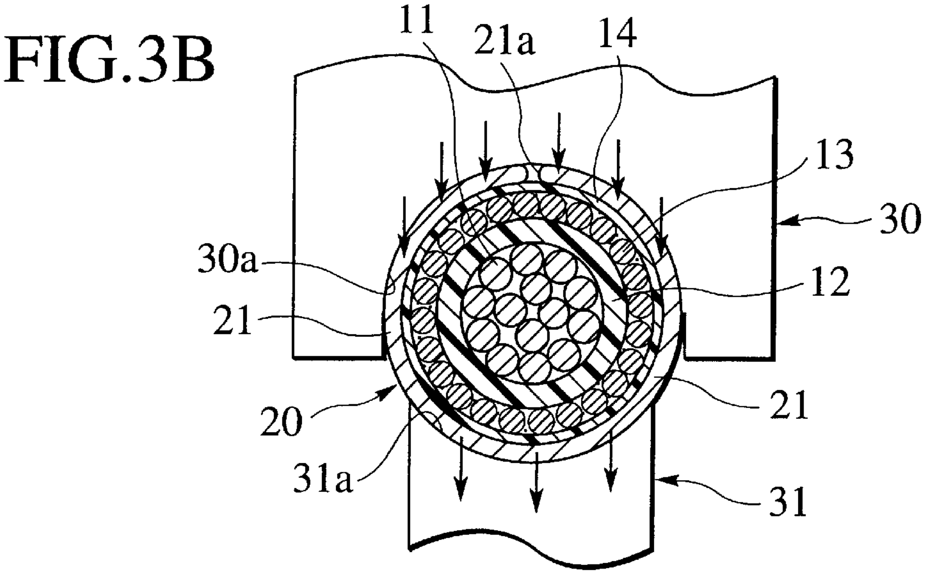
FIG. 3B is a cross-section view that shows the shielded cable and shield terminal during the joining process.
Figure 3C:
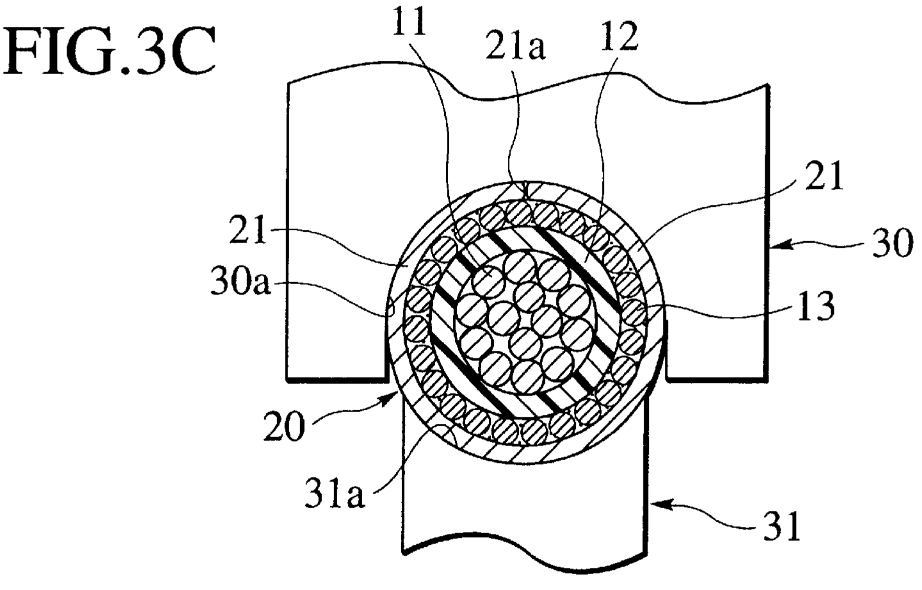
FIG. 3C is a cross-section view that shows the shielded cable and shield terminal after the joining is completed.
Figure 4:
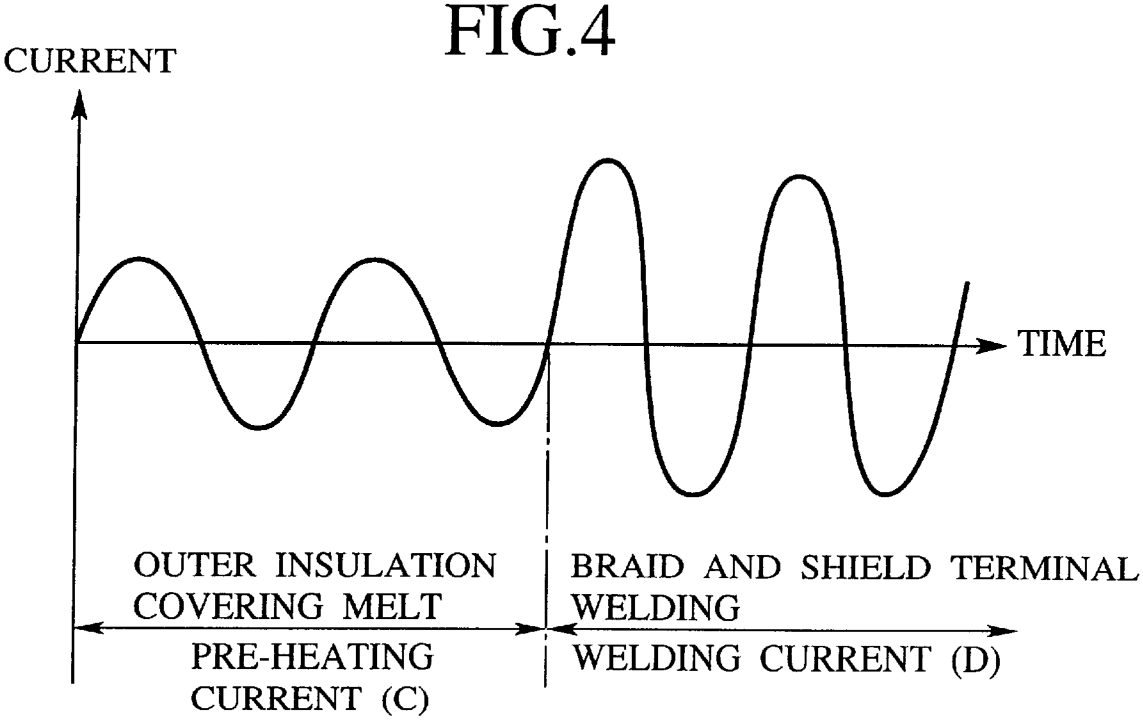
FIG. 4 is a graph that illustrates the relationship between the resistive welding current and time when joining the above-noted shielded cable and the shield terminal.

Next, as shown in FIG. 3B and FIG. 4, a pre-heating current C is caused to flow between the pair of electrode tips 30 and 31 while crimping the crimping parts 21 therebetween, thereby causing the generation of Joule heat, this heat causing part of the outer insulation covering 14 at the end A of the shielded cable 10 (only the part that makes contact with the crimping parts 21) to soften and be removed by the applied force. Next, a welding current D is caused to flow between the pair of electrode tips 30 and 31 so that, as shown in FIG. 2C and FIG. 3C, a weld is made between the pair of crimping parts 21 of the shield terminal 20 and the part of the braid 13 that was exposed by removing part of the outer insulation covering at end A of the shielded cable 10. Next, the terminal fixture 15 which is crimped onto the inner core wire 11 of the shielded cable 10 and the shield terminal 20 that is welded onto end A of the braid 13 are attached to the inside of a hood 16*a* of a connector 16.

In this manner, by using resistive welding with the pair of crimping parts 21 of the shield terminal 20 crimped onto the outer insulation covering 14 at end A of the shielded cable 10 so as to remove only the part of the outer insulation covering with which the crimping parts 21 make contact, thereby exposing part of the braid 13 at end A of the shielded cable 10, it is possible to minimize damage to the braid and broken connections, and also to improve the reliability of the connection. Additionally, because there is no need to separate the braid 13 from the inner insulation 12 or remove part of the outer insulation covering 14 at end A as was done in the past, the shielding performance can be improved. As shown in FIG. 1A and FIG. 2C, because the ends 21*a* of the crimping parts 21 of the shield terminal 20 make contact with the outer insulation covering 14 of the shielded cable 10 in an arc that proceeds from the top downward, it is possible to fully hold the braid 13 of the shielded cable 10 within the pair of crimping parts 21 without a space occurring between the ends 21*a* thereof, thereby reliably preventing damage to and broken connections in slender braid wires. By doing this, there is a further improvement in the reliability of the electrical connection between the shielded cable 10 and the shield terminal 20.

According to the method of joining the shielded cable 10 to the shield terminal 20 according to the present invention, by setting the pair of crimping parts 21 of the shield terminal 20 over the outer insulation covering 14 at end A of the shielded cable 10, after which a pre-heating current C used to melt away part of the outer insulation covering while crimping the crimping parts 21, and then welding the crimping parts 21 to the part of the braid 13 that was exposed by melting away the outer insulation covering 14 therefrom, the need to have a separate process step to remove part of the outer insulation covering is eliminated, thereby simplifying the process and improving workability.

Figure 5A:
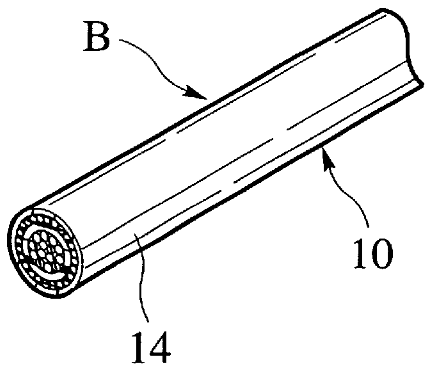
FIG. 5A is a perspective view that shows the condition before joining the above-noted shield terminal to an intermediate position along the shielded cable.
Figure 5B:
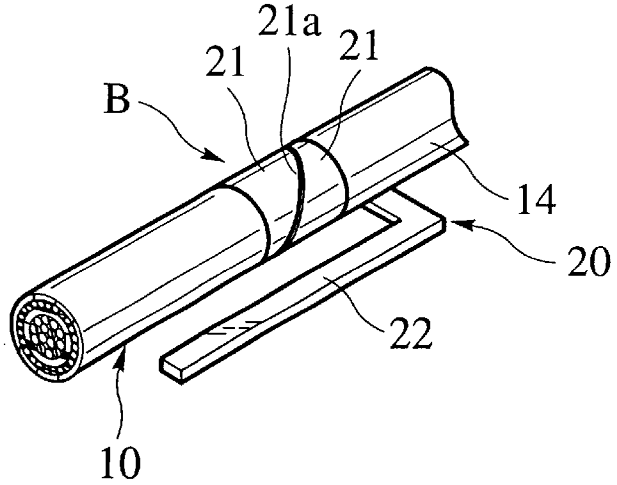
FIG. 5B is a perspective view that shows the condition in which the joining of the shield terminal has been made to an intermediate position along the shielded cable.

As shown in FIG. 5A and FIG. 5B, the pair of crimping parts 21 are welded to the braid 13 while being simultaneously crimped over the outer insulation covering 14 at an intermediate position B along the shielded cable 10. By doing this, it is possible via the crimping parts 21 of the shield terminal 20 to easily and reliably join the shield terminal 20 to any grounding position along the shielded cable 10, including end A and an intermediate position B.

Figure 6:
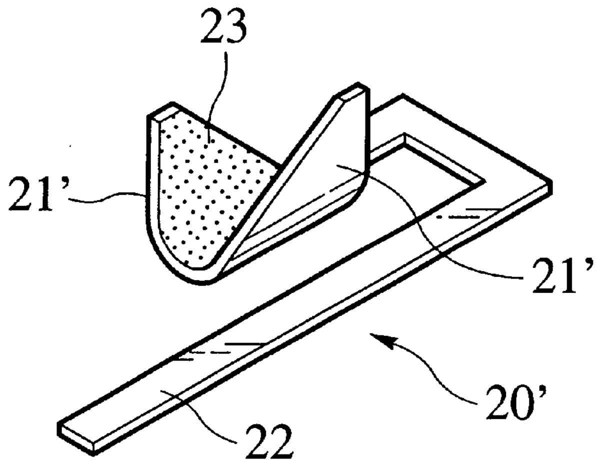
FIG. 6 is a perspective view that shows another embodiment of a shield terminal according to the present invention.

In another embodiment of a shield terminal 20', shown in FIG. 6, the difference with respect to the shield terminal 20 is that there is the application of a low-melting-point substance 23, such as solder, which is melted by ultrasonic vibration, to the inner surfaces of the pair of crimping parts 21, the braid 13 at end A of the shielded cable 10 being ultrasonically welded to the pair of crimping parts 21' of the shield terminal 20'. When this is done, heat generated internally by the application of ultrasonic vibration causes the low-melting-point substance 23 that is applied to the crimping parts 21' to melt, this melted low-melting-point substance 23 forming an ultrasonic fusing between the crimping parts 21' of the shield terminal 20 and the braid 13 of the shielded cable 10. When this joint is made, because the melted low-melting-point substance 23 encroaches between the weaving of the braid 13, there is a great joining force between the braid 13 and the crimped pair of crimping parts 21' of the shield terminal 20, thereby providing a further improvement in the reliability of the connection.

Figure 7:
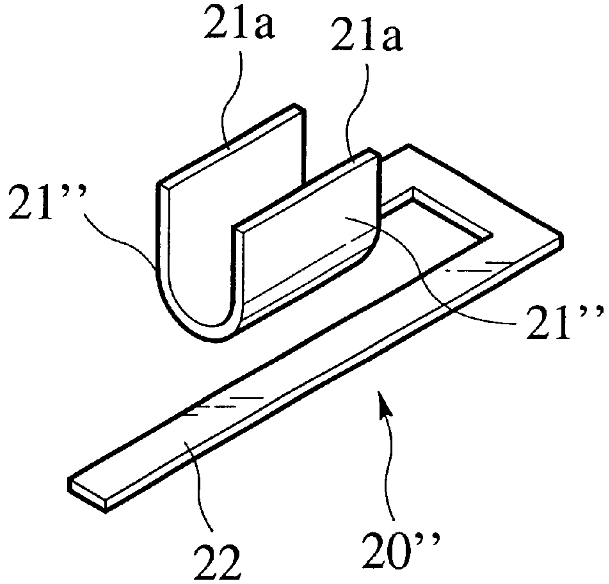
FIG. 7 is a perspective view that shows yet another embodiment of a shield terminal according to the present invention.
Figure 8A:
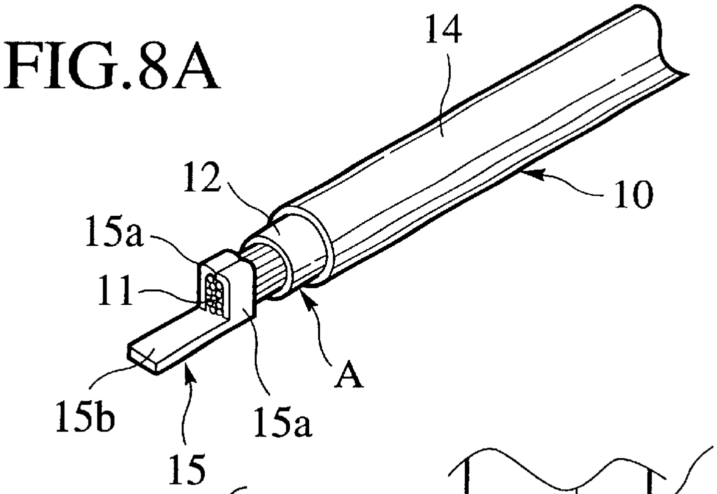
FIG. 8A is a perspective view of the shielded cable to which another embodiment of the present invention is applied.
Figure 8B:
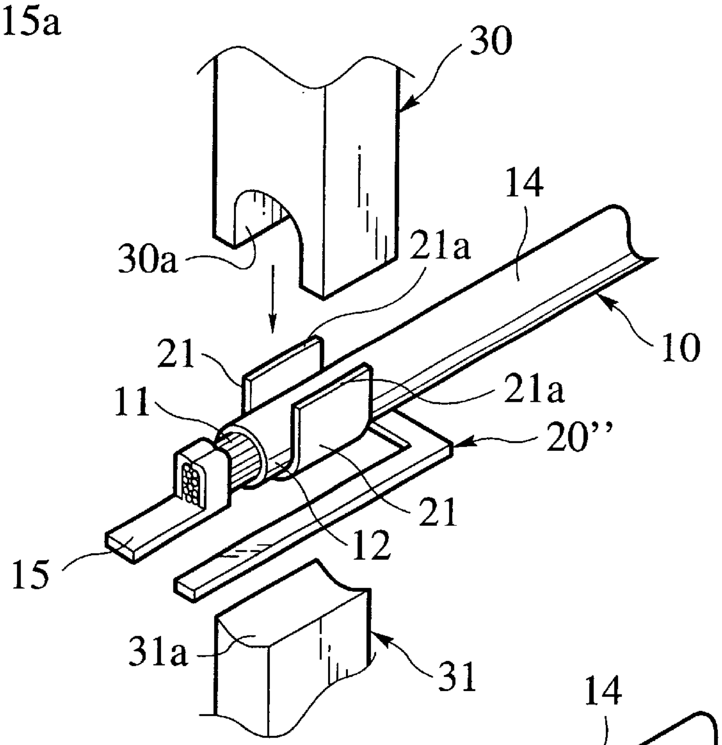
FIG. 8B is a perspective view that shows the condition before the shielded terminal is joined to the shield cable.
Figure 8C:
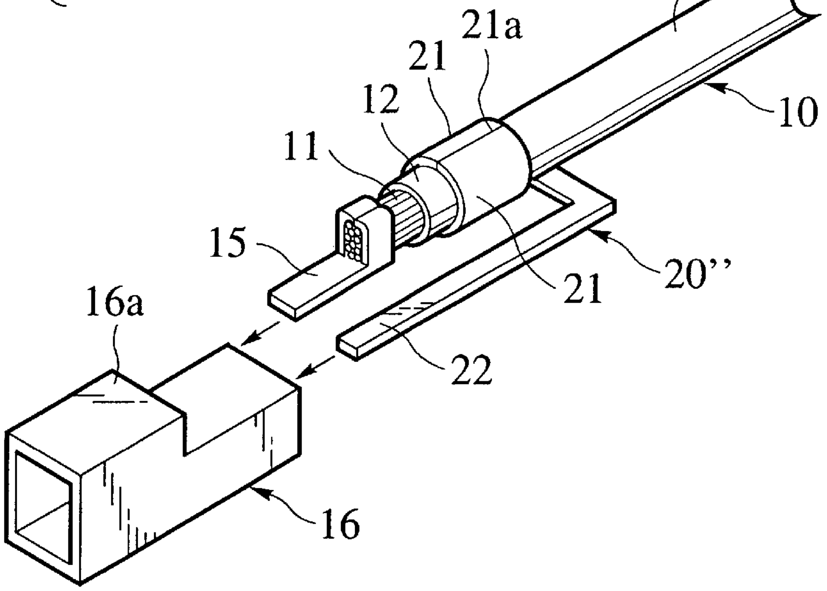
FIG. 8C is a perspective view that shows the condition after joining the shielded cable to the shield terminal.

As shown in FIG. 7 and FIG. 8, which show another embodiment of a shielded cable joining structure according to the present invention, when the pair of crimping parts 21" are crimped, the ends of the bent rectangular parts thereof make contact with one another along a line that is parallel to the longitudinal direction of the braid and other elements of the shielded cable 10. As shown in FIG. 8A through FIG. 8C, the connection between the shield terminal 20" and the shielded cable 10 is made a method similar to that of the first-described embodiment. Specifically, as shown in FIG. 8B, the pair of crimping parts 21" of the shield terminal 20" are fitted over end A of the shielded cable 10, and then the crimping parts 21" are held between a curved surface 30*a* of an upper electrode tip 30, which serves also as a crimper, and a curved surface 31*a* of a lower electrode tip 31, which serves also as an anvil, pressure being thereby applied to the crimping parts 21". Next, a pre-heating current C is caused to flow between the pair of electrode tips 30 and 31 while crimping the crimping parts 21" therebetween, thereby causing the generation of Joule heat, this heat causing part of the outer insulation covering 14 at the end A of the shielded cable 10 (only the part that makes contact with the crimping parts 21") to soften and be removed by the applied force. Next, a welding current D is caused to flow between the pair of electrode tips 30 and 31 so that, as shown in FIG. 8C, a weld is made between the pair of crimping parts 21" of the shield terminal 20" and the exposed part of the braid 13 at end A of the shielded cable 10.

In this manner, by using a shield terminal 20 that has a pair of crimping parts 21" that when crimped make contact with each other along a line that is parallel to the longitudinal direction of the shielded cable 10, as shown in FIG. 8C, it is possible to completely hold the braid at end A or an intermediate position along the shielded cable 10 within the crimping parts 21", without the occurrence of a space between the ends 21*a* of the crimping parts 21", thereby reliably preventing damage to and broken connections in slender braid wires. By doing this, there is a further improvement in the reliability of the electrical connection between the shielded cable 10 and the shield terminal 20".

While the foregoing embodiments of the present invention were described for the case in which a shield terminal is joined to an end or an intermediate position of a shielded cable, it is understood that it possible to connect a shield terminal to both an end and an intermediate position of a shielded cable.

What is claimed is:

1. A joining structure for a shielded cable, comprising:

an inner core wire made of a conductor;

an inner insulation covering that covers the inner core wire;

a braid that is provided around the outside periphery of the inner insulation covering;

an outer insulation covering that covers the braid;

a shield terminal that has a crimping part that is crimped over the outer insulation covering, said crimping part displacing the outer insulation covering to provide a substantially continuous circumferential contact between said crimping part and said braid;

wherein the crimping part of the shield terminal and the braid are welded in the substantially continuous circumferential contact; and a low melting point substance on an inner surface of said crimping part of the shield terminal, said substance increasing the strength of the weld of the crimping part and the braid.

2. A joining structure for a shielded cable according to claim 1, wherein the crimping part of the shield terminal is substantially U-shaped, with mutually opposing end parts capable of making mutual contact at an inclination.

3. A joining structure for a shielded cable according to claim 1, wherein the crimping part of the shield terminal is substantially U-shaped, with mutually opposing end parts capable of making mutual contact along a direction that is parallel to the longitudinal direction of the braid.

4. A joining structure for a shielded cable, comprising:

an inner core wire made of a conductor;

an inner insulation covering that covers the inner core wire;

a braid that is provided around the outside periphery of the inner insulation covering;

an outer insulation covering that covers the braid;

a shield terminal comprising a pair of crimping parts, said crimping parts being crimped circumferentially over the outer insulation covering, said crimping parts displacing the outer insulation covering to provide a substantially continuous circumferential contact between said crimping parts and said braid;

wherein said crimping parts of the shield terminal and the braid are welded in the substantially continuous circumferential contact; and a low melting point substance on an inner surface of said crimping parts of the shield terminal, said substance increasing the strength of the weld of the crimping parts and the braid.

5. A joining structure for a shielded cable according to claim 4, wherein the crimping parts of the shield terminal form a substantially U-shape, with mutually opposing end parts capable of making mutual contact at an inclination.

6. A joining structure for a shielded cable according to claim 4, wherein the crimping parts of the shield terminal form a substantially U-shape, with mutually opposing end parts capable of making mutual contact along a direction that is parallel to the longitudinal direction of the braid.

* * * * *